United States Patent

[11] 3,593,038

[72] Inventors Nils Hylten-Cavallius;
Carl Ingvar Boksjo; Sven Erland Lindblad,
all of Ludvika, Sweden

[21] Appl. No. 572,250
[22] Filed Aug. 15, 1966
[45] Patented July 13, 1971
[73] Assignee Allmanna Svenska Elektriska Aktiebolaget
Vasteras, Sweden
[32] Priority Aug. 13, 1965
[33] Sweden
[31] 10581/65

[54] FIRING CIRCUIT FOR SERIES-CONNECTED CONTROLLED SEMICONDUCTOR RECTIFIERS
4 Claims, 6 Drawing Figs.

[52] U.S. Cl. .......... 307/252 L, 307/296, 307/305, 307/311, 328/2, 321/22, 321/27, 250/214, 250/227
[51] Int. Cl. .......... H03k 17/00
[50] Field of Search .......... 307/252, 296, 305, 311, 278, 252 L, 252 M; 328/2, 210, 211; 321/27, 22; 250/208, 209, 214, 227

[56] References Cited
UNITED STATES PATENTS

| | | | |
|---|---|---|---|
| 3,355,600 | 11/1967 | Mapham | 307/278 |
| 3,317,752 | 5/1967 | Zuk | 307/252 |
| 3,386,027 | 5/1968 | Kilgore et al. | 250/209 X |
| 3,267,290 | 8/1966 | Diebold | 307/296 X |

*Primary Examiner*—Donald D. Forrer
*Assistant Examiner*—Harold A. Dixon
*Attorneys*—Bailey, Stephens and Huettig and Jennings Bailey, Jr.

ABSTRACT: A chain of series-connected semiconductor rectifiers has a voltage divider connected in parallel therewith. A firing circuit is connected on the one hand to the control electrode and to one of the main electrodes of each rectifier and on the other hand to two different points on the voltage divider. The firing circuit derives a control voltage between such points, which is fed to the rectifier by a switching means, such as an optically controlled semiconductor.

INVENTOR.
CARL INGVAR BÖRSSON; SVEN ERLAND GUSTAV LINDBLAD; NILS HYLTEN-CAVALLIUS
BY
Bailey, Stephens & Huettig
ATTORNEYS INVENTOR.
CARL INGVAR BOKSJO; SVEN ERLAND GUSTAV LINDBLAD
NILS HYLTEN-CAVALLIUS
BY
Bailey, Stephens & Huettig
ATTORNEYS INVENTOR.
CARL INGVAR BORSJO; SVEN ERLAND GUSTAV LINDBLAD
NILS HYLTEN-CAVALLIUS
BY
Bailey, Stephens & Huettig
ATTORNEYS

FIRING CIRCUIT FOR SERIES-CONNECTED CONTROLLED SEMICONDUCTOR RECTIFIERS

ABSTRACT OF THE DISCLOSURE

A chain of series-connected semiconductors rectifiers has a voltage divider connected in parallel therewith. A firing circuit is connected on the one hand to the control electrode and to one of the main electrodes of each rectifier and on the other hand to two different points on the voltage divider. The firing circuit derives a control voltage between such points, which is fed to the rectifier by a switching means, such as an optically controlled semiconductor.

This invention relates to a firing circuit for controlled semiconductor rectifiers parallel-connected to a voltage divider.

A number of arrangements for so-called slave-firing of series-connected controlled rectifiers are known. In these usually only one of the rectifiers is given a control impulse from a control impulse device, after which the firing of the other rectifiers in turn is triggered by the firing of this rectifier. This method, however, has the disadvantage that, particularly with high voltages and a great number of rectifiers, the total firing time for the entire rectifier chain is unsuitably long. Further, if no special precautions are taken, the later firing rectifiers will be subjected to high overvoltages.

It is also known, with the help of one or more transformers, to transmit control impulses from a control impulse device to each rectifier. This method is, however, unsuitable with a great number of series-connected rectifiers since the transformer will be complicated and it must also have extremely strong insulation to resist the high potential differences between different windings.

When series-connecting controlled semiconductor rectifiers, it is usually necessary, parallel with the rectifier chain, to connect a voltage divider which is connected to the joining points of the rectifiers. In this way an uneven distribution of the forward and reverse blocking voltages between the rectifiers is prevented.

According to the invention the voltage divider already there is used for firing the rectifiers. The invention is characterized in that the voltage necessary for firing a rectifier is taken out between two points on the voltage divider and that the firing is arranged to be triggered with the help of a controlled semiconductor element connected between the voltage divider and the rectifier.

Figures 1, 2:
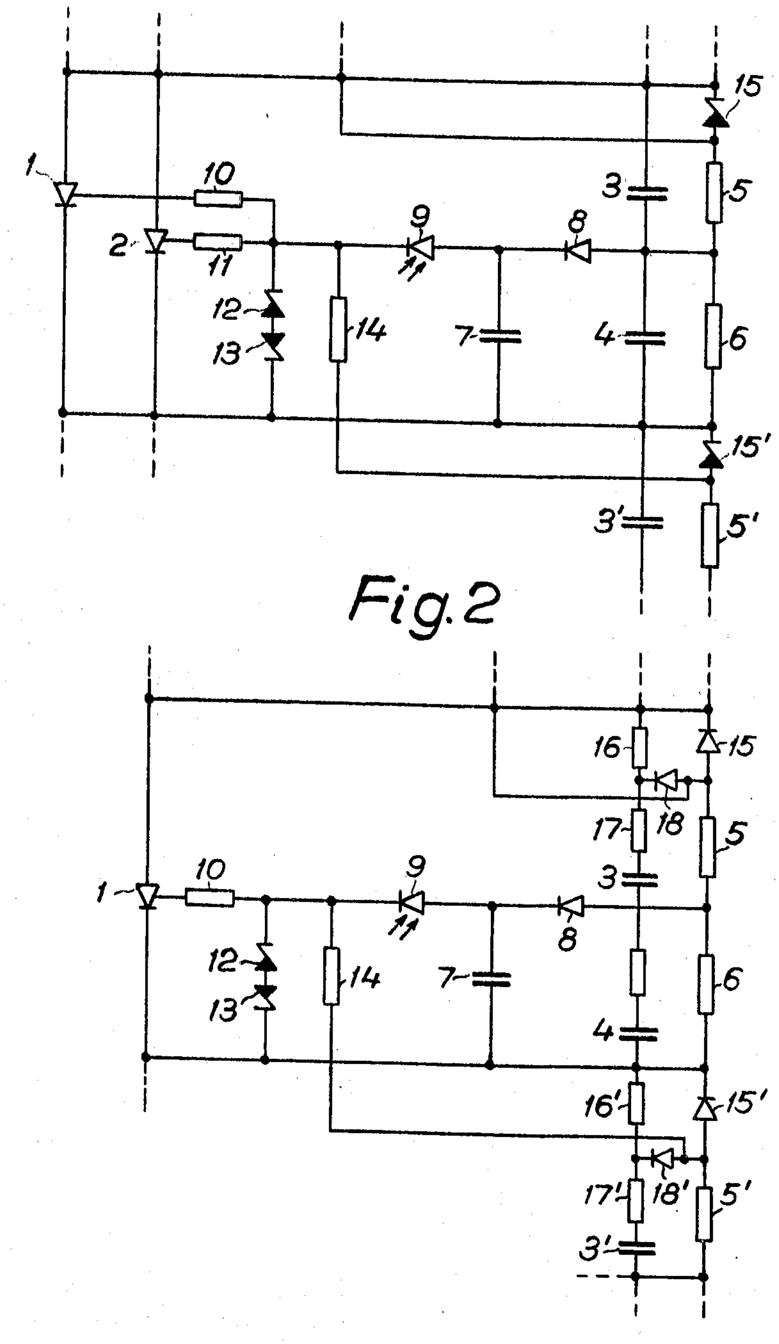
Figure 3:
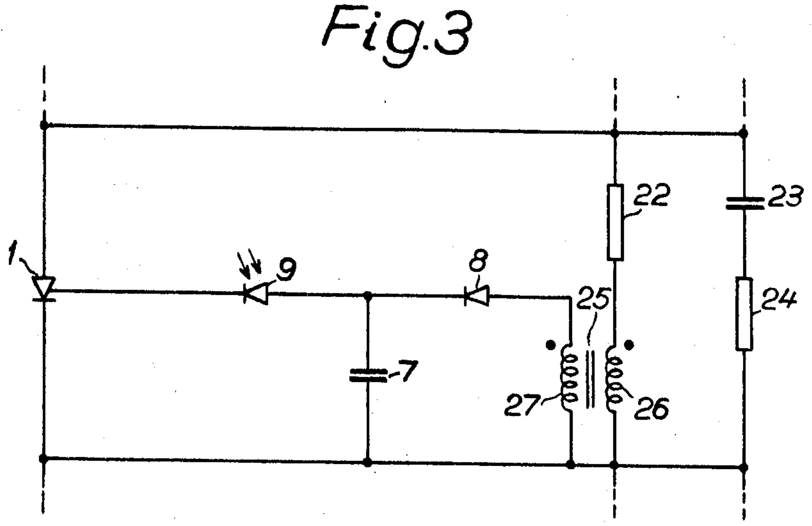
Figure 4:
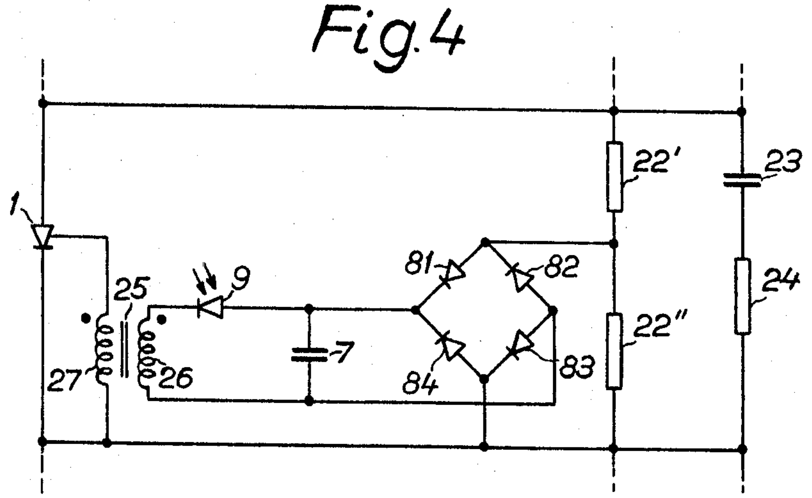

The invention will, in the following, be more fully described with reference to the accompanying figures. FIG. 1 shows a firing circuit where the energy necessary for firing is taken out from the voltage divider during the forward blocking interval of the rectifier. FIG. 2 shows a device where the voltage divider can also be used, at steep voltage transients, to give an increased negative voltage to the control electrodes of the rectifiers. FIGS. 3 and 4 show circuits where transformers are connected between the voltage divider and the controlled semiconductor rectifiers in order to obtain suitable values of the control current to the rectifiers.

Figure 5:
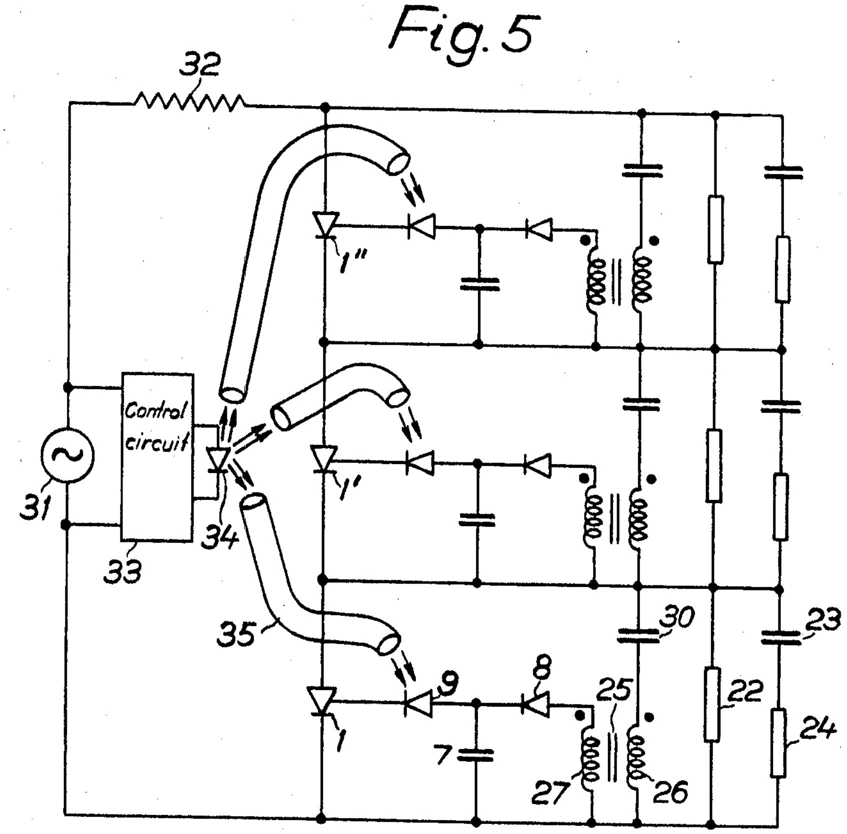
Figure 6:
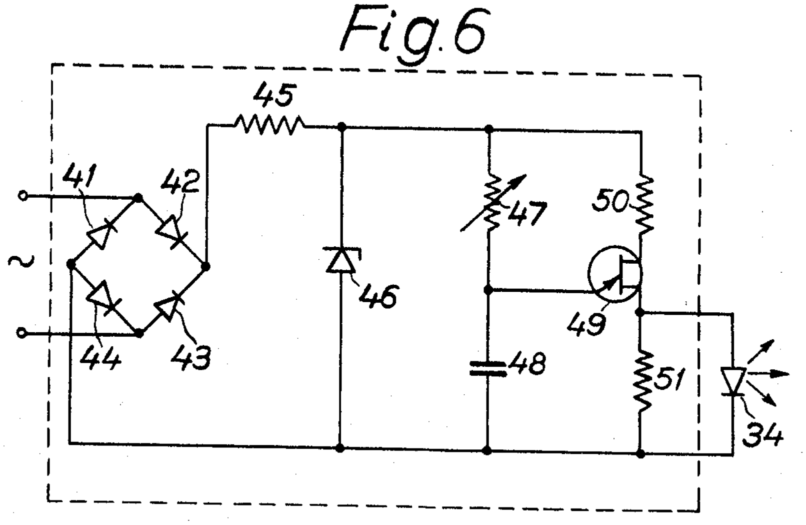

FIG. 5 shows a circuit according to the invention for controlling the power delivered to a load from an AC source. FIG. 6 shows in detail the control circuit of FIG. 5.

In FIG. 1 the thyristor 1 and the thyristor 2 are included, each in its own chain of series-connected thyristors, the other parts of which are not shown. The chains are parallel-connected with each other in such a way that the joining points between the rectifiers in the one chain are connected to corresponding points in the other chain. These points are also connected to points on a voltage divider parallel-connected to the rectifier chains, the section of the voltage divider parallel-connected with the thyristors 1 and 2 consisting of the capacitors 3 and 4 and the resistors 5 and 6. The capacitor 3′ and the resistor 5′ of an adjacent section of the voltage divider are shown. During the forward blocking interval of the rectifiers the capacitor 7 is charged through the diode 8. When the optically controlled semiconductor element 9, which may comprise an optically controlled auxiliary thyristor, is triggered with the help of a light impulse transmitted from a control device, the thyristors 1 and 2 receive a control impulse. Two resistors 10 and 11 distribute the firing current equally between the thyristors. The mutually opposed zener diodes 12 and 13 limit the amplitude of the voltage supplied to the ignition electrodes of the thyristors to a harmless value. The control electrodes are connected through a resistor 14 to a point on the voltage divider which, during a forward blocking interval, is negative in relation to the cathodes of the rectifiers. In this way the risk is decreased of unwanted firing of the thyristors during this interval. The zener diode 15 prevents the control electrodes from becoming positive in relation to the cathodes during the reverse blocking interval, which would result in increased leakage current. It may also be suitable during the forward blocking interval to lead the whole voltage divider current through the firing circuits of the thyristors. The zener diode 15 may then be replaced by a normal diode whereby all the voltage divider current flows in at the cathodes of the rectifiers and out through their control electrodes.

In the shown arrangement the voltage divider consists of parallel-connected capacitors and resistors. It may also, of course, consist of only capacitors or only resistors. With regard to the firing the shown voltage divider has the advantage over one with only resistors that the resistors can be made with higher resistances and despite this, due to the capacitors, sufficient firing impulse energy is obtained. Normally the capacitors are series-connected to damping resistors. In this case it may be advisable to increase the negative control current for rapid overvoltages, for example in accordance with FIG. 2.

The embodiment shown in this FIG. differs from that described above only in the shape of the voltage divider. The capacitors 3 and 3′ are series-connected with the resistors 16, 17 and 16′, 17′ respectively, which act as damping resistors. The diodes 18 and 18′ are connected between the joining point between these resistors and the joining point between the diodes 15, 15′ and the resistors 5, 5′ , respectively. The anode of the diode 18′ is connected to the control electrode of the thyristor 1 through the resistors 14 and 10. When a steep overvoltage occurs during the forward blocking interval there is a risk of undesired firing of the thyristor. This is prevented with the shown arrangement. A steep overvoltage will for the greatest part be taken up by the resistors (16′, 17′ ), because a capacitor has a low impedance for a rapid process. This causes an increase in the negative control current which during the forward blocking interval normally flows in through the cathode of the thyristor 1 and out through its control electrode and through the resistors 10 and 14 to the resistor 5′. So that the negative voltage between the cathode and the control electrode shall not be so great that the thyristor runs the risk of being destroyed, the resistances of the resistors 16 and 16′ are suitably chosen much smaller than the resistances of the resistors 17 and 17′.

The capacitor 7 and the diode 8 may be left out. The voltage divider and, therewith, the capacitor 4, are however discharged during the firing so that it is impossible in this way to obtain long control impulses. In the shown embodiment the diode 8 enables the capacitor 7 to supply control current for a long time, possibly 120°, so that the difficulties of operation with a discontinuous load current are avoided.

The two zener diodes 12 and 13 may be replaced by other voltage-limiting devices such as nonlinear resistors.

If the disturbance level permits the connection from the control electrodes through the resistor 14 and the diode 15 to be left out, the two zener diodes 12 and 13 may be replaced by a single zener diode, whereby the voltage of the control electrodes is limited to the interval between zero and a suitably positive value.

The invention can of course be used on a single rectifier chain or more than two parallel-connected chains. In the embodiments shown above of course the desired value of pulse length and amplitude may be obtained by a suitable choice of the values of the impedances included in the firing circuit.

It is possible, and in certain cases may be advantageous, instead to charge the capacitor 7 during the reverse blocking interval of the thyristor. This can easily be achieved by reversing the diodes 8 and 9. To obtain the correct polarity for the firing impulse a transformer is then suitably inserted between the diode 9 and the thyristor.

A disadvantage with the arrangements shown above is, however, that the currents arising in the voltage divider are relatively low, while controlled semiconductor rectifiers (thyristors) may demand a considerably greater firing current. A typical value for the current level in a voltage divider for a thyristor chain is 1 or a few tens of milliamperes. A high power thyristor, however, may require a firing current of some hundreds of milliamperes to secure firing. Thus, in certain cases, it may be difficult or impossible to take out of a voltage divider a sufficient quantity of electricity to fire the thyristors.

According to the development of the invention, this problem is solved by connecting a transformer between the voltage divider and the control electrode of the controlled semiconductor rectifier (thyristor), whereby the primary winding of the transformer, which winding is connected to the voltage divider, has a greater number of winding turns than its secondary winding, which is connected to the control electrode. In this way a transformation is achieved of the high voltage and low current level prevailing in the voltage divider to the low voltage and high current level required for firing.

According to one embodiment of the invention the primary winding of the transformer is connected to the voltage divider while its secondary winding, through a rectifier, is connected to an energy-storing means which, in its turn, is connected through the controlled semiconductor element to the control electrode of the controlled semiconductor rectifier (thyristor). This embodiment has the advantage that the energy-storing means operates at a low voltage level.

According to a second embodiment, where the energy-storing means is connected over a rectifier to the voltage divider, the transformer is connected between the controlled semiconductor element and the control electrode of the controlled semiconductor rectifier (thyristor). This embodiment has the advantage that the energy-storing means need only store a relatively small amount of electricity.

According to a preferred embodiment the energy-storing means consists of a capacitor.

In FIG. 3, 1 is the controlled semiconductor rectifier (thyristor) in a chain of series-connected rectifiers to be fired by the device according to the invention. It is parallel-connected to a section of the voltage divider of the rectifier chain, which section consists of the resistor 22, capacitor 23 and resistor 24. The primary winding 26 of the transformer 25 is connected in series with the resistor 22 of the voltage divider. The secondary winding 27 is in series with the rectifier 8 connected to the capacitor 7 which acts as energy-storing means. The optically controlled semiconductor element 9 is connected between the capacitor and the control electrode of the thyristor 1.

With the polarity of the transformer windings shown in the figures, the capacitor 7 will be charged during the forward blocking interval of the thyristor 1. When the semiconductor element 9 is triggered with the help of a light impulse from a control impulse device, the capacitor 7 is discharged through the control electrode of the thyristor and fires the thyristor. Due to the step-up transformation of the current from the voltage divider, such a long and powerful current impulse is obtained that certain firing results even high power thyristors.

By reversing the polarity of one of the windings of the transformer 25 the capacitor 7 can be charged during the reverse blocking interval of the thyristor, which may be an advantage.

The rectifier 8 gives only half wave rectification. By using instead a full wave rectifier, for example a rectifier-bridge as shown in FIG. 4, with relatively few additional components the capacitor can be made to be supplied with energy both during the reverse and the forward blocking intervals of the thyristor. In this way it is ensured that sufficient firing energy is stored at every moment in the capacitor.

The primary winding 26 of the transformer 25 may also be connected in the branch of the voltage divider section comprising the capacitor 23.

In FIG. 4 the resistive branch of the voltage divider section consists of two resistors 22′ and 22″. The capacitor 7 is fed by the rectifier-bridge consisting of the rectifiers 81—84 with the voltage prevailing across the resistor 22″. When the semiconductor element 9 is triggered the capacitor is discharged through the primary winding 26 of the transformer 25 and firing current is supplied to the control electrode of the thyristor 1.

The firing circuit according to the invention may be complemented by known arrangements for limiting the amplitude of the control current and for obtaining suitable bias voltages to the control electrode during the reverse and forward blocking intervals, respectively, of the controlled semiconductor rectifier.

The controlled semiconductor element 9 is shown as an optically triggered thyristor, but may instead be another type of element known per se, such as a phototransistor or photodiode. The element may form a part of a switch connection for connecting control current to the controlled semiconductor rectifiers.

The controlled semiconductor element can be controlled other than optically, for example by means of a current impulse fed to a control electrode on the element.

FIG. 5 shows a firing circuit according to the invention used in a connection for regulation of the current through a resistive load. This load, shown as the resistor 32, is connected to the AC voltage source 31 (for instance the AC mains) in series with the three thyristors 1, 1′ and 1″. In parallel with the thyristors is connected a voltage divider which consists of three identical sections. The section in parallel with the thyristor 1 consists of the resistor 22 in parallel with the capacitor 23 and the damping resistor 24. In parallel with this thyristor is also connected the primary winding 26 of the transformer 25 in series with a capacitor 30. The secondary winding 27 of the transformer is connected through the diode 8 the energy-storing capacitor 7, which through the optically controlled semiconductor element (such as auxiliary thyristor) is connected to the control electrode of thyristor 1. A control circuit 33 known per se is supplied from and synchronized by the AC source. Its output consists of pulses with a variable phase displacement in relation to the voltage of the AC source. A light-emitting diode (such as a laser diode) 34 is connected to the output of the control circuit and emits light pulses which are carried to the semiconductor element 9 by means of a light conductor, for example a bundle of glass fibers, and trigger this element and thereby initiate the firing of thyristor 1. The light pulses from the control circuit are also carried to the firing circuits of thyristors 1′ and 1″ whereby all three thyristors are fired simultaneously.

By varying the phase displacement of the light pulses the average or r.m.s. value of the current through the load 32 may be controlled. The control circuit which makes this possible is shown more in detail in FIG. 6. The voltage from the AC source is rectified in the rectifier bridge which consists of the diodes 41, 42, 43 and 44. A resistor 45 and a zener diode 46 limit the amplitude of the output voltage of the bridge. The capacitor 48 is charged through the variable resistor 47 and is connected to the emitter of the unijunction transistor 49, which is connected in series with the resistors 50 and 51 in parallel with the zener diode 46. When the capacitor voltage reaches a certain value in relation to the base voltage of the transistor, the capacitor is rapidly discharged and an output pulse is obtained across resistor 51. The light emitting diode 34 then emits a light pulse which in the way earlier described initiates the firing of the thyristors. The phase displacement of the output pulses of the control circuit is varied by means of the variable resistor 47.

As shown above, the firing circuit according to the invention has the advantage over earlier known methods that, despite the fact that optically controlled thyristors for high voltages and currents are not yet available, the advantages of optical transmission can also be utilized in semiconductor rectifier converters for high effects. In this way the disadvantages, connected with earlier firing systems, of long total firing time for a rectifier chain as in slave-firing) or difficulties with transmission of the electrical firing impulses over great potential differences, are avoided.

We claim:

1. In a chain of series-connected semiconductor controlled rectifiers having a voltage divider connected in parallel to said rectifier chain, each rectifier having a control electrode and at least one main electrode and firing circuit connected to the control electrode and one of the main electrodes of said rectifier on the one hand and on the other hand to two different points on the voltage divider, said firing circuit comprising means to derive a control voltage from the voltage between said points on the voltage divider and switching means for connecting said control voltage to the control electrode, thereby firing the rectifier, said means to drive a control voltage comprising a rectifying means connected to said points on the voltage divider and a capacitor connected to said rectifying means, said capacitor being also connected to said switching means, said voltage deriving means including a transformer, said transformer having input and output terminals, said input terminals being connected to said two points on the voltage divider, at least one of said output terminals being connected to said rectifying means.

2. A firing circuit according to claim 1, the polarity of said transformer and of said rectifying means being so selected as to cause the capacitor to be charged during the reverse blocking intervals of said semiconductor controlled rectifiers.

3. A firing circuit according to claim 1, said rectifying means being a full-wave rectifying means having its AC terminals connected to said points of said voltage divider and its DC terminals connected to said capacitor.

4. In a chain of series-connected semiconductor controlled rectifiers having a voltage divider connected in parallel to said rectifier chain, each rectifier having a control electrode and at least one main electrode and a firing circuit connected to the control electrode and one of the main electrodes of said rectifier on the one hand and on the other hand to two different points on the voltage divider, said firing circuit comprising means to derive a control voltage from the voltage between said points on the voltage divider and switching means for connecting said control voltage to the control electrode, thereby firing the rectifier, said means to derive a control voltage comprising a rectifying means connected to said points on the voltage divider and a capacitor connected to said rectifying means, said capacitor being also connected to said switching means, a transformer, said transformer having input and output terminals, at least one of said input terminals being connected to said switching means, one of said output terminals being connected to said control electrode.